United States Patent
Baseeth (10) Patent No.: US 10,898,873 B2
(45) Date of Patent: Jan. 26, 2021

(54) LECITHIN COMPOSITIONS AND METHODS OF MAKING AND USING SUCH LECITHIN COMPOSITIONS

(71) Applicant: Archer Daniels Midland Company, Decatur, IL (US)

(72) Inventor: Shireen S. Baseeth, Decatur, IL (US)

(73) Assignee: ARCHER DANIELS MIDLAND COMPANY, Decatur, IL (US)

(*) Notice: Subject to any disclaimer, the term of this patent is extended or adjusted under 35 U.S.C. 154(b) by 0 days.

(21) Appl. No.: 15/735,415

(22) PCT Filed: Jun. 10, 2016

(86) PCT No.: PCT/US2016/036865
§ 371 (c)(1),
(2) Date: Dec. 11, 2017

(87) PCT Pub. No.: WO2016/201209
PCT Pub. Date: Dec. 15, 2016

(65) Prior Publication Data
US 2018/0178178 A1    Jun. 28, 2018

Related U.S. Application Data

(60) Provisional application No. 62/174,325, filed on Jun. 11, 2015, provisional application No. 62/320,212, filed on Apr. 8, 2016.

(51) Int. Cl.
| | | |
|---|---|---|
| B01F 17/00 | (2006.01) | |
| A23D 9/013 | (2006.01) | |
| C11D 17/00 | (2006.01) | |
| C11B 13/00 | (2006.01) | |
| A23D 9/007 | (2006.01) | |
| C11B 3/16 | (2006.01) | |

(Continued)

(52) U.S. Cl.
CPC ......... B01F 17/0092 (2013.01); A23D 9/007 (2013.01); A23D 9/013 (2013.01);
(Continued)

(58) Field of Classification Search
CPC ..... B01F 17/0092; A23D 9/013; A23L 35/10; A23G 4/08; A23G 4/10; C11B 13/00
See application file for complete search history.

(56) References Cited

U.S. PATENT DOCUMENTS

4,842,865 A * 6/1989 Durr ................. A61K 31/685
424/456
5,601,858 A * 2/1997 Mansukhani ........... A23G 4/00
426/3

(Continued)

FOREIGN PATENT DOCUMENTS

DE          1227191 B   * 10/1966
WO   WO 2014/160823    * 10/2014

OTHER PUBLICATIONS

DE1227191 (B); Waechtler, Process for the preparation of liquid lecithin preparations, 1996, 3 pages, English translation (Year: 1966).*

(Continued)

Primary Examiner — Yate' K Cutliff
(74) Attorney, Agent, or Firm — Andrew F. Nilles (57) ABSTRACT

The present invention is directed towards compositions comprising a lecithin; a sugar alcohol, a sugar, or combinations of any thereof; and an alcohol. Compositions comprising a water soluble surfactant are further disclosed. Methods of separating oil from a mixture are disclosed. Methods of dispersing an oil are further disclosed. Compositions comprising a water-dilutable microemulsion are disclosed. Methods of making chewing gum are disclosed. Methods of recovering oil from a mixture are further disclosed.

15 Claims, 6 Drawing Sheets

Effect of additives on corn oil recovery from ethanol dry grind process (51) Int. Cl.
*C11D 1/94* (2006.01)
*A23G 4/08* (2006.01)
*A23G 4/10* (2006.01)
*A23G 4/06* (2006.01)
*A23L 35/00* (2016.01)

(52) U.S. Cl.
CPC ............... *C11B 3/16* (2013.01); *C11B 13/00* (2013.01); *C11D 1/94* (2013.01); *C11D 17/0017* (2013.01); *A23G 4/066* (2013.01); *A23G 4/08* (2013.01); *A23G 4/10* (2013.01); *A23L 35/10* (2016.08); *A23V 2002/00* (2013.01)

(56) References Cited

U.S. PATENT DOCUMENTS

| | | | | |
|---|---|---|---|---|
| 2005/0287180 A1* | 12/2005 | Chen | ............... | A61K 9/0019 424/400 |
| 2008/0194410 A1* | 8/2008 | Baseeth | ............... | C05G 3/70 504/363 |
| 2010/0136175 A1* | 6/2010 | Skiff | ............... | A23L 2/38 426/72 |
| 2011/0021592 A1* | 1/2011 | Magdassi | ............. | A61K 9/5123 514/406 |
| 2013/0004621 A1* | 1/2013 | Schrader | ............... | A23D 9/00 426/73 |
| 2013/0156835 A1* | 6/2013 | Sardo | ............... | A01N 65/00 424/405 |

OTHER PUBLICATIONS

Resnik, S., Quillaia Extracts, Type 1 and Type 2; Chemical and Technical Assessment, 61st Joint FAO/WHO Expert Committee on Food Additives, pp. 1-9 (Year: 2004).*

Randhawa, K. K.S., et al., Rhamnolipid biosurfactants—past, present, and futhre scenario of global market, Frontiers in Microbiilogy, vol. 5, article 454, pp. 1-7 (Year: 2014).

\* cited by examiner

Fig. 1: Deoiled lecithin (5% by weight) dissolved in a 75:25 ratio of sorbitol/ethanol (made using a 70% sorbitol solution) (pictured on the left); deoiled lecithin (5% by weight) dissolved in a 75:25 ratio of sucrose/ethanol (made using a 70% sucrose solution) (pictured in the middle); deoiled lecithin (5% by weight) dissolved in a 75:25 ratio of high fructose corn syrup/ethanol (made using a 70% high fructose corn syrup solution) (pictured on the right)

Fig. 2: Water/ethanol (70:30) mixture with the addition of 5% by weight fluid lecithin (pictured on the left) compared to sorbitol/ethanol (70:30) mixture made using a 70% sorbitol solution, with the addition of 5% by weight fluid lecithin (pictured on the right)

Fig. 3a: Opaque water/ethanol (75:25) mixture with the addition of 25% by weight deoiled lecithin (pictured on the left); opaque dispersion made with the composition pictured on the left Fig. 3b: Clear sorbitol/ethanol (75:25) solution made using a 70% sorbitol solution, with the addition of 25% by weight deoiled lecithin (pictured on the left); dispersion made with the composition pictured on the left Fig. 4: Clear composition comprising 50% by weight APG, 21% by weight deoiled lecithin, and 30% sorbitol/ethanol solution (70:30) made using a 70% sorbitol solution (pictured on the left); dispersion made with the composition pictured on the left Fig. 5a: Clear composition comprising 6% APG, 40% deoiled lecithin, 54% sorbitol/ethanol solution (67:33) made using a 70% sorbitol solution (pictured on the left); dispersion made with the composition pictured on the left Fig. 5b: Opaque composition comprising 6% APG, 40% deoiled lecithin, 54% water/ethanol solution (67:33); dispersion made with the composition pictured on the left Fig. 6: Effect of additives on corn oil recovery from ethanol dry grind process Fig. 7: Effect of additives on corn oil recovery from ethanol dry grind process Fig. 8: De-emulsification functionality of additives Fig 9: Left to Right- 300 ppm additives (Control; Polysorbate chemistry; Example 16; Example 17)

Fig 10: Left to Right- 300 ppm additives (Control; Polysorbate chemistry; Example 18; Example 19)

LECITHIN COMPOSITIONS AND METHODS OF MAKING AND USING SUCH LECITHIN COMPOSITIONS

CROSS-REFERENCE TO RELATED APPLICATIONS

This application is a national stage entry of International Application No. PCT/US2016/36865, filed Jun. 10, 2016, which itself claims priority to U.S. Provisional Patent Application No. 62/174,325, filed Jun. 11, 2015, and to U.S. Provisional Patent Application No. 62/320,212, filed Apr. 8, 2016, each of the contents of the entirety of which are incorporated by this reference.

TECHNICAL FIELD

The present invention relates generally to compositions comprising a lecithin; a sugar alcohol, a sugar, or combinations of any thereof; and an alcohol. The compositions may be used for improving the separation of oil from oil containing mixtures or emulsions. The present disclosure is further directed to water soluble surfactant blends. The present invention additionally relates to methods of separating oil from a mixture, methods of dispersing an oil, and methods of recovering an oil from a mixture. Compositions comprising a water-dilutable microemulsion are further disclosed. Methods of making chewing gum are disclosed.

BACKGROUND OF THE INVENTION

The advantages and production of ethanol from corn are well known. For example, WO 2015/057191 A1 to General Electric Company discloses that over the past few decades, ethanol has become increasingly important as an alternative fuel, and that ethanol from corn is produced by either the wet-milling or dry-milling process.

The production of corn oil is also well known. For example, US 2014/0275589 A1 to Blakenburg et al. discloses that while most commercial corn oil is produced by front end fractionation of corn germ during the wet mill corn process, corn oil may also be obtained from a by-product of the dry-mill process used in the ethanol industry. In the dry-mill ethanol process, corn is milled, liquefied, and fermented. The resulting ethanol is distilled off and the remaining whole stillage, which contains a concentrated oil fraction, is separated via centrifugation into a liquid fraction, called thin stillage, and a solid fraction, called wet cake. The thin stillage may be concentrated via evaporation into thick stillage, also called syrup. The concentrating effect dry-milling has on the oil fraction has made corn-oil extracted from thick stillage a profitable co-product for the ethanol industry.

Current methods of extracting corn oil from thick stillage are known. For example, US 2014/0275589 A1 to Blakenburg et al. discloses that solvent extraction using hexane is an effective method. However, hexane extraction is energy intensive and requires a large amount of capital investment. As an alternative that requires little capital investment, decantation using centrifuges is another effective method, although the success of current corn oil decantation is highly dependent on upstream processing conditions, with high temperatures, high or low pH, smaller grind, and long periods of retention tending to have increased oil yields.

Additionally, WO 2015/057191 A1 to General Electric Company discloses a method for recovering oil from an oil containing mixture or emulsion wherein the mixture or emulsion is contacted with a combined treatment of a polyol derived from sorbitol, a sorbitan, or isosorbide and an ester of a polyethylene glycol and a fatty acid. Alternatively, US 2014/0275589 A1 discloses a composition which may aid in the extraction of an emulsified oil from an oil and water emulsion, wherein the composition includes silicon containing particles at a level of 0.1 wt. % to 30 wt. %, an emulsifying agent at a level of 1 wt. % to 30 wt. %, and water at a level of 40 wt. % to 99 wt. %.

Generally, polysorbates, such as polyoxyethylene sorbitan monooleate, are water soluble compounds that can be used as surfactants or emulsifiers. The fatty acid portion of the polysorbate can be derived from stearic, oleic, or palmitic acid. Typically, polysorbates are used as an additive to aid in corn oil extraction because of its water solubility and wide-acceptance as a feed ingredient by the Association of American Feed Control Officials (AAFCO) manual. Because the corn oil recovery process involves water, a water soluble emulsifier is desirable so as to stay at the interface to demulsify and allow the corn oil to separate. Other emulsifiers, such as ethoxylated monoglycerides and PEG 400 mono- or di-oleates are also allowed for use in animal feeds.

However, outside of ethylene oxide chemistry, there are limited options for food/feed-safe, water soluble emulsifiers, particularly for use in corn oil extraction. Emulsifiers such as diacetyl monoglyceride of tartaric acid (DATEM) and monoglycerides have a very low HLB and minimal solubility in water. Similarly, methyl glucosides of coconut oil esters require a high HLB product to aid in solubility. APG is a surfactant made from renewable sources, such as fatty alcohols and starch. According to the Food and Drug Administration (FDA), there is a Generally Recognized as Safe (GRAS) notice that GRN 000237 APG can be used in cleaning fruits, vegetables, meat, and poultry products. However, GRAS of a substance is specific to the use. Therefore, GRAS approval is still needed for use of APG in the context of animal feed applications. Studies have shown that inclusion of APG in the diet of goats increased the intestinal and total tract digestibility of organic matter and neutral detergent fiber, an effect similar to that of other nonionic surfactants including polyoxyethylene sorbitan monostearate.

Additionally, the de-emulsification properties of silica are known, for example in the context of water-petroleum emulsions, as disclosed in U.S. Pat. No. 4,029,596 to Fink et al. In the context of corn oil de-emulsification, US Patent Application 2014/0275589 to Blankenburg et al. discloses a blend of 80% by weight water, 10% by weight silica, and 10% by weight polysorbate 80.

There exists a need for improved methods for recovering corn oil from byproducts of the dry-mill process used in the ethanol industry. Additionally, there exists a need for improved corn oil extraction aid compounds.

On a related topic, lecithin alone is not water soluble. There has been a limitation on the use of commercial lecithin in applications in which transparency of the final product is required. Hydrotopes are more commonly used in microemulsion formulations to help with clarity and limit the formation of liquid crystalline structures that negatively impact viscosity. Hydrotopes also increase the solubilization of hydrophobic substances in a given formulation. Typically in such microemulsion systems, polar substances such as toluene or xylene sulfonates are used. In some cases wherein high HLB nonionic surfactants are present, short chain glucoside surfactants are used. Lecithin has a lower HLB and is water dispersible, but at higher concentrations of lecithin in water, a high viscosity results which is similar to the consistency of mayonnaise. In applications such as a clear body wash, lecithin is less desirable despite beneficial properties lecithin could contribute, such as lubricity and enhancement of skin softness. Another disadvantage of commercial lecithin is in the context of making water dilutable microemulsions. In household as well as industrial and institutional (I&I) cleaning products that are microemulsion-based, lecithin is rarely considered a suitable emulsifier.

Therefore, having a water soluble lecithin would be desirable and create a new market for lecithin in the personal care industry. A water soluble lecithin would also create a huge market for this less-recognized emulsifier in household as well as industrial and institutional cleaning products, and other, industries.

SUMMARY OF THE INVENTION

In one embodiment, a composition comprising a lecithin; a sugar alcohol, a sugar, or combinations of any thereof; and an alcohol is disclosed.

In another embodiment, a water soluble surfactant blend comprising about 0-60% of a cosurfactant; about 5-60% of a lecithin; about 5-60% of a sugar alcohol, a sugar, or combinations of any thereof; and less than about 15% of an alcohol is disclosed.

In an additional embodiment, a method of separating oil from a mixture comprising adding the composition or the water soluble surfactant blend of the previous embodiments to the mixture is disclosed.

In yet another embodiment, a method of dispersing an oil comprising adding the composition or the water soluble surfactant blend of the previous embodiments to the oil is disclosed.

In still a further embodiment, a water-dilutable microemulsion comprising the composition or the water soluble surfactant blend of the previous embodiments and a compound selected from the group consisting of a soy methyl ester, limonene, an oil, and combinations of any thereof is disclosed.

In an additional embodiment, a method of making chewing gum comprising combining the composition or the water soluble surfactant blend of the previous embodiments with a flavoring, thus forming a flavoring blend, and adding the flavoring blend to a gum base is disclosed.

In another embodiment, a method of recovering oil from a mixture, comprising adding a composition to the mixture, wherein the composition comprises a lecithin cosurfactant blend comprising 50-90% lecithin and a cosurfactant, the cosurfactant having a hydrophilic-lipophilic balance value of between 12 and 16 and the blend having a hydrophilic-lipophilic balance value of between 10 and 18 is disclosed.

DETAILED DESCRIPTION OF THE INVENTION

In one embodiment, the present invention is directed towards compositions comprising a lecithin; a surfactant; and an oil. In further embodiments, the compositions comprise silica. In yet further embodiments, the compositions comprise a sugar alcohol, a sugar, or combinations of any thereof. In still further embodiments, the compositions comprise an alcohol.

In another embodiment, the present invention is directed towards compositions comprising a lecithin; a sugar alcohol, a sugar, or combinations of any thereof; and an alcohol.

In another embodiment, the present invention is directed towards water soluble surfactant blends comprising about 0-60% of a cosurfactant; about 5-60% of a lecithin; about 5-60% of a sugar alcohol, a sugar, or combinations of any thereof; and less than about 15% of an alcohol.

In another embodiment, the present invention is directed towards methods of recovering oil from a mixture, comprising adding a composition to the mixture; wherein the composition comprises a lecithin cosurfactant blend comprising lecithin and a cosurfactant, the cosurfactant having a hydrophilic-lipophilic balance value of between 12 and 16 and the blend having a hydrophilic-lipophilic balance value of between 10 and 18.

In another embodiment, the present invention is directed towards methods of separating oil from a mixture comprising adding the composition or the water soluble surfactant blend of the embodiments of this invention to the mixture.

In another embodiment, the present invention is directed towards methods of dispersing an oil comprising adding the composition or the water soluble surfactant blend of the previous embodiments to the oil.

In another embodiment, the present invention is directed towards water-dilutable microemulsions comprising the composition or the water soluble surfactant blend of the previous embodiments and a compound selected from the group consisting of a soy methyl ester, limonene, an oil, and combinations of any thereof.

In another embodiment, the present invention is directed towards methods of making chewing gum comprising combining the composition or the water soluble surfactant blend of the previous embodiments with a flavoring, thus forming a flavoring blend, and adding the flavoring blend to a gum base.

In another embodiment, the present invention is directed towards methods of recovering oil from a mixture, comprising adding a composition to the mixture, wherein the composition comprises a lecithin cosurfactant blend comprising 50-90% lecithin and a cosurfactant, the cosurfactant having a hydrophilic-lipophilic balance value of between 12 and 16 and the blend having a hydrophilic-lipophilic balance value of between 10 and 18.

In another embodiment, the present invention is directed towards compositions comprising a surfactant and a compound selected from the group consisting of lecithin, an oil, silica, and combinations of any thereof.

In a further embodiment, the sugar alcohol or the sugar is a solution. In still further embodiments, the compositions of the present invention are liquid.

Microemulsions are clear, isotropic, thermodynamically stable liquid mixtures including oil, water, and a surfactant (cosurfactant). The water phase may contain salt(s) and/or other ingredients. Microemulsions may be prepared from a large number of components. In contrast to ordinary emulsions, microemulsions form upon simple mixing of the components and do not require high shear conditions. In ternary systems, such as microemulsions, where two immiscible phases (water and 'oil') are present next to the surfactant phase, the surfactant molecules form a monolayer at the interface between oil and water, with the hydrophobic tails of the surfactant molecules dissolved in the oil phase and the hydrophilic head groups in the aqueous phase. Comparable to the binary systems (water/surfactant or oil/surfactant), self-assembled structures of different morphologies can be obtained ranging from (inverted) spherical and cylindrical micelles to lamellar phases and bi-continuous microemulsions. A water-in-oil microemulsion is an optically transparent mixture including oil, water, and surfactant. Water droplets are in a continuous oil phase stabilized by surfactant.

The present invention contemplates many types of surfactant and cosurfactants. The surfactant or cosurfactant may comprise one or more cationic surfactants, one or more anionic surfactants, one or more nonionic surfactants, biobased emulsifiers, or combinations of any thereof. In various embodiments, the surfactant or cosurfactant or combinations may have a hydrophilic-lipophilic balance ranging from 10.0 to 18.0.

Cationic surfactants suitable for use in the disclosed compositions and methods include, but are not limited to, fatty amine salts; fatty alkyl quaternary amines including primary, secondary, and tertiary amines; ester amines and the corresponding ethoxylated ester amines; and combinations of any thereof.

Anionic surfactants suitable for use in the disclosed compositions and methods include, but are not limited to, sodium and potassium salts of straight-chain fatty acids, polyoxyethylenated fatty alcohol carboxylates, linear alkyl benzene sulfonates, alpha olefin sulfonates, sulfonated fatty acid methyl ester, aryl alkanesulfonates, sulfosuccinate esters, alkyldiphenylether(di)sulfonates, alkylnaphthalenesulfonates, isoethionates, alkylether sulfates, sulfonated oils, fatty acid monoethanolamide sulfates, polyoxyethylene fatty acid monoethanolamide sulfates, aliphatic phosphate esters, nonylphenolphosphate esters, sarcosinates, fluorinated anionics, anionic surfactants derived from oleochemicals, and combinations of any thereof.

Nonionic surfactants suitable for use in the disclosed compositions and methods include, but are not limited to, sorbitan monostearate, polyoxyethylene ester of rosin, polyoxyethylene dodecyl mono ether, polyoxyethylene-polyoxypropylene block copolymer, polyoxyethylene monolaurate, polyoxyethylene monohexadecyl ether, polyoxyethylene monooleate, polyoxyethylene mono(cis-9-octadecenyl) ether, polyoxyethylene monostearate, polyoxyethylene monooctadecyl ether, polyoxyethylene dioleate, polyoxyethylene distearate, polyoxyethylene sorbitan monolaurate, polyoxyethylene sorbitan monooleate, polyoxyethylene sorbitan monopalmitate, polyoxyethylene sorbitan monostearate, polyoxyethylene sorbitan trioleate, polyoxyethylene sorbitan tristearate, polyglycerol ester of oleic acid, polyoxyethylene sorbitol hexastearate, polyoxyethylene monotetradecyl ether, polyoxyethylene sorbitol hexaoleate, fatty acids, tall-oil, sorbitol hexaesters, ethoxylated castor oil, ethoxylated soybean oil, rapeseed oil ethoxylate, ethoxylated fatty acids, ethoxylated fatty alcohols, ethoxylated polyoxyethylene sorbitol tetraoleate, glycerol and polyethylene glycol mixed esters, alcohols, polyglycerol esters, monoglycerides, sucrose esters, alkyl polyglycosides, polysorbates, fatty alkanolamides, polyglycol ethers, derivatives of any thereof, and combinations of any thereof.

In still further embodiments, the surfactant or cosurfactant is selected from the group consisting of polysorbates, sorbitan esters, polyglyceril esters, sucrose esters, alkyl polyglucosides, alkyl polyglycosides, polaxmers, PLURONIC brand ethylene oxide/propylene oxide block copolymer, ethoxylated fatty acids, ethoxylated monoglycerides, propylene glycol, polyethylene glycol esters, sodium dodecyl sulfate (SDS), sodium lauryl sulfate (SLS), quillaja, rhamnolipids, sophorolipids, derivatives of any thereof, and combinations of any thereof. In preferred embodiments, the surfactant or cosurfactant is the alkyl polyglycosides.

In further embodiments, the surfactant or cosurfactant is present in an amount of about 0-60% by weight of the composition. In preferred embodiments, the surfactant or cosurfactant is present in an amount about 40-60% by weight of the composition. In more preferred embodiments, the surfactant or cosurfactant is present in an amount of about 50% by weight of the composition.

Lecithin is a versatile emulsifier. Commercial lecithin has a hydrophilic-lipophilic balance (HLB) in a range of 4-10, depending on whether the lecithin is a fluid containing oil or is deoiled. There are many modified lecithins, including fractionated lecithin, lecithin with enzyme modified phospholipids, acetylated lecithin, hydrolyzed lecithin, and hydroxylated lecithin. Lecithin in its various forms has dispersion properties but is not completely water soluble. Table 1, below, shows the dispersion rating and emulsification capacity of various types of lecithin. In Table 1, a rating of 1=poor and a rating of 5=excellent.

TABLE 1

Dispersion and Emulsifying Capacity of Soy Lecithin

| Type of Lecithin | Dispersion Rating | Emulsification Capacity |
| --- | --- | --- |
| Standard fluid lecithin | 1 | 2 |
| Standard deoiled - powder | 0 | 2 |
| High phosphatidyl choline fraction | 0 | 4 |
| Acetylated fluid/oil free | 4 | 4 |
| Hydrolyzed fluid/oil free | 4 | 5 |
| Hydroxylated fluid/oil free | 5 | 5 |

Lecithin is comprised of four main phospholipids: phosphatidyl choline (PC), phosphatidyl ethanolamine (PE), phosphatidyl inositol (PI), and phosphatidic acid (PA). Each of these phospholipids has unique functionality, and some applications desire one specific phospholipid for its properties. In such cases, fractionation is required. Alcohol fractionation of lecithin is known. This fractionation is based on the differences in solubility of the phospholipids in alcohol. Fluid and deoiled lecithin have different soluble fractions in 100% ethanol. In Table 2, below, the alcohol fractionation of both crude soy lecithin and deoiled soy lecithin are shown.

TABLE 2

Alcohol Fractionation of Soy Lecithin

| | Triglycerides (%) | Phosphatidyl Choline (PC) (%) | Yield (%) |
|---|---|---|---|
| Crude Lecithin Soluble Fraction: | 39 | 15 | |
| Ethanol (100%) | 60 | 22 | 26 |
| Ethanol (95%) | 48 | 33 | 15 |
| Ethanol (90%) Insoluble Fraction: | 23 | 46 | 12 |
| Ethanol (95%) Deoiled Lecithin Soluble Fraction: | 38 2.5 | 7 24 | 85 |
| Ethanol (100%) Insoluble Fraction: | 2.5 | 52 | 28 |
| Ethanol (100%) | 2.5 | 12 | 72 |

The present invention contemplates using many types of lecithin, including crude lecithin, fluid lecithin, deoiled lecithin, fractionated lecithin, high phosphatidyl choline (PC) fraction lecithin, acetylated lecithin, hydrolyzed lecithin, hydroxylated lecithin, lecithin comprising enzyme modified phospholipids, and combinations of any thereof. In preferred embodiments, the lecithin is deoiled lecithin or fluid lecithin.

In further embodiments, the lecithin is present in an amount from about 5% to about 60% by weight of the composition. In preferred embodiments, the lecithin is present in an amount from about 5% to about 25% by weight of the composition. In certain preferred embodiments, the lecithin is present in an amount of about 40% by weight of the composition.

The present invention contemplates many types of sugar alcohols, including sugar alcohols comprising 3-12 carbon atoms. In further embodiments, the sugar alcohol is selected from the group consisting of sorbitol, erythritol, xylitol, mannitol, lactitol, maltitol, isomalt, and combinations of any thereof. In preferred embodiments, the sugar alcohol is sorbitol.

In further embodiments, the sugar alcohol comprises a solution having from about 55% of the sugar alcohol to about 85% of the sugar alcohol.

In further embodiments, the sugar alcohol is present in an amount of at least about 5% by weight of the water soluble composition. In yet further embodiments, the sugar alcohol to the alcohol ratio is from about 60:40 to about 90:10.

The present invention contemplates many types of sugars, including corn syrup, high fructose corn syrup, glucose, fructose, sucrose, and combinations of any thereof.

The present invention contemplates many types of alcohols, selected from the group consisting of C1-C4 alcohols including methanol, ethanol, propanol, and butanol; water soluble alcohols; and combinations of any thereof. In preferred embodiments, the alcohol is ethanol. In further embodiments, the alcohol is present in an amount of less than about 10% by weight of the composition.

In further embodiments, the composition comprises silica. In other embodiments, the silica is hydrophilic.

In further embodiments, the composition is water soluble.

In further embodiments, the composition is used to recover: corn oil in a corn to ethanol process, sorghum oil in a sorghum to ethanol process, or combinations thereof.

In further embodiments, the composition is used as a base concentrate to make a microemulsion. In yet further embodiments, the composition is used to form a microemulsion with oil, a flavor, a color, an antioxidant, a bioactive, and combinations of any thereof.

In further embodiments, the composition is used to disperse an oil. In still further embodiments, the oil is selected from the group consisting of mint oil, vegetable oils, essential oils, and combinations of any thereof. In preferred embodiments, the oil is mint oil.

In further embodiments, the composition comprising a surfactant and a compound selected from the group consisting of lecithin, an oil, silica, and combinations of any thereof, comprises an oil selected from the group consisting of canola oil, plant oils, vegetable oils, essential oils, and combinations of any thereof. In preferred embodiments, the oil is canola oil.

In further embodiments, the water soluble surfactant blends of the present invention are combined with a compound selected from the group consisting of soy methyl esters, limonene, mint oil, and combinations of any thereof.

In further embodiments, the methods of separating oil from a mixture contemplate the mixture selected from the group consisting of whole stillage, thin stillage, syrup, feed, water, and combinations of any thereof. In still further embodiments, the mixture comprises the oil.

In further embodiments, the gum base of the present invention comprises an emulsifier.

The present invention contemplates many co-solvents, including short chain fatty alcohols; acids; esters; sugar alcohols including sorbitol, glycerol, ethylene glycol, propylene glycol; triglycerides; diglycerides; food grade mineral oils; plant oils; and combinations of any thereof.

In preferred embodiments, the present invention contemplates methods of recovering oil from a mixture, comprising adding a composition to the mixture, wherein the composition comprises 80% by weight lecithin, 10% by weight ethoxylated monoglycerides, 2% by weight propylene glycol, and 8% by weight soybean oil. In further embodiments, the methods of recovering oil from a mixture further comprises centrifuging the mixture.

The invention is further explained by the following non-limiting examples.

Example 1: Solubility of Lecithin

When ethanol is slowly diluted in water, with the addition of lecithin, the nature of lecithin fractionation changes. In this example, deoiled lecithin was added to a water:ethanol mixture (70:30 ratio), and a very viscous dispersion was obtained. Water and ethanol have the ability to form azeotropes, and the azeotropic mixtures have properties different from water or ethanol. When the water in the mixture was replaced with a 70% sorbitol solution, the deoiled lecithin formed a completely clear, water soluble solution. Therefore, the fractionation of lecithin in alcohol can be reversed by the addition of a sorbitol solution.

Example 2: Fractionation of Lecithin

Based on the dielectric constant values for ethanol ($\varepsilon=25$), water ($\varepsilon=80$), and a 70% sorbitol solution ($\varepsilon=62$), as well as the results of Example 1, at a theoretical dielectric constant of $\varepsilon=52$, a complete dissolution of lecithin leading to a clear, water soluble solution should be achieved. Common polar solvents were tested to determine if they would indeed give rise to a water soluble lecithin. Surprisingly, DMSO, which has the closest dielectric constant to the theoretical dielectric constant of ε=52, resulted in totally insoluble lecithin and fractionation. The solvents tested are summarized along with their dielectric constants in Table 3, below. Therefore, dielectric constant alone is not determinative of the ability of a solvent to produce water soluble lecithin.

TABLE 3

Solvents Which Failed to Produce Water Soluble Lecithin

| Solvent | Dielectric Constant (∈) |
|---|---|
| Propylene Glycol | 32 |
| Glycerol | 46 |
| DMSO | 50 |
| Corn Syrup | 56 |

Example 3: Solubility of Sorbitol in Ethanol

Sugar alcohols can become heavily supersaturated upon cooling. When water is slowly replaced with ethanol, there can be a significant change in the maximum concentration at which the solute is completely soluble. In this example, blends of a 70% sorbitol solution and ethanol were made. The sorbitol/ethanol blends were found to be completely clear at a ratio of 70:30. Blends with greater than 30% ethanol were found to have crystallization of the sorbitol.

Example 4: Solubility of Lecithin in Mixtures

Figure 1:
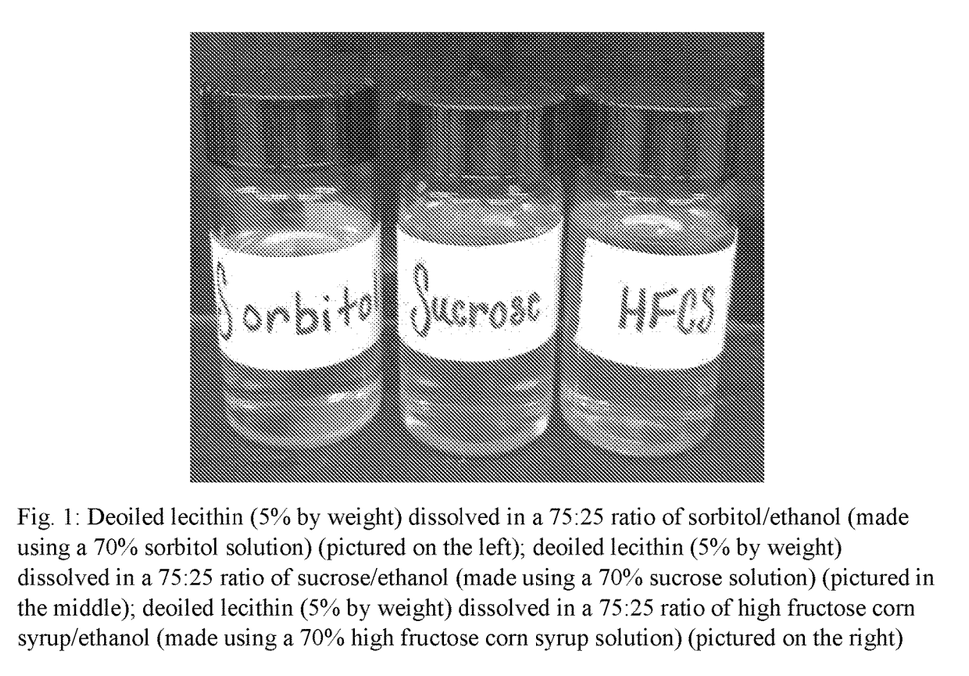
FIG. 1 shows a picture of embodiments of compositions of the present invention.

In this example, blends of a sugar alcohol or a sugar were made with ethanol, and 5% by weight deoiled lecithin was added. Deoiled lecithin (5% by weight) was dissolved in a 75:25 ratio of sorbitol/ethanol (made using a 70% sorbitol solution), which resulted in a clear solution. (FIG. 1, vial labeled "Sorbitol"). The 70% sorbitol solution was replaced with a 70% sucrose solution, and 5% by weight deoiled lecithin was added to a ratio of 75:25 sucrose/ethanol (made using the 70% sucrose solution), which resulted in a clear solution. (FIG. 1, vial labeled "Sucrose"). The 70% sorbitol solution was replaced with a 70% high fructose corn syrup solution (HFCS, from ADM), and 5% by weight deoiled lecithin was added to a ratio of 75:25 HFCS/ethanol (made using the 70% HFCS solution), which resulted in a clear solution. (FIG. 1, vial labeled "HFCS").

Example 5: Comparison of Water Solubility of Lecithin in Mixtures

Figure 2:
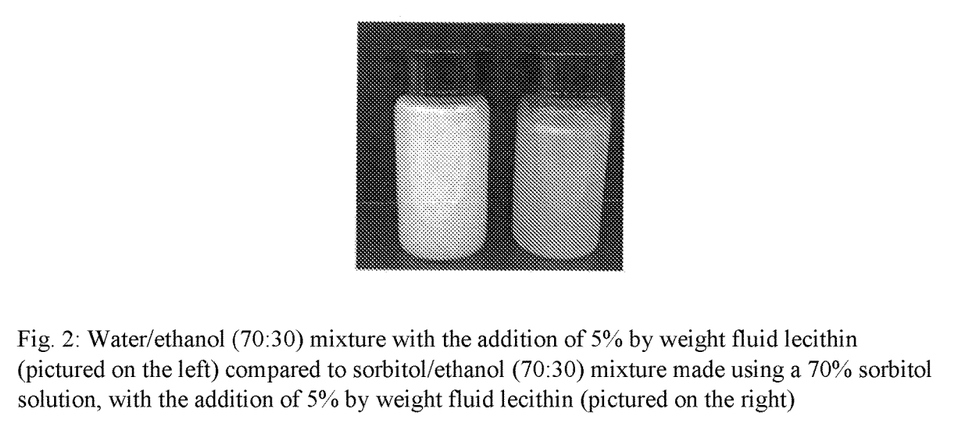
FIG. 2 shows a picture of additional embodiments of a composition of the present invention.

In this example, 5% by weight a blend of fluid lecithin with a high HLB was added to a 70:30 water/ethanol mixture, and the resulting mixture was compared to a mixture wherein 5% by weight a blend of fluid lecithin with a high HLB was added to a 70:30 sorbitol/ethanol mixture (made using a 70% sorbitol solution). (FIG. 2). Fluid lecithin was found to be more soluble (slightly cloudy appearance) in the 70:30 sorbitol/ethanol mixture (made using a 70% sorbitol solution) as compared to the fluid lecithin in the 70:30 water/ethanol mixture (opaque appearance). (FIG. 2). The presence of sorbitol in a lecithin mixture/dispersion lowers the viscosity of the mixture, which could be exploited in making concentrated dispersions of fluid lecithin which typically have a very high viscosity.

Example 6: Comparison of Water Solubility of Lecithin in Mixtures

Figure 3A:
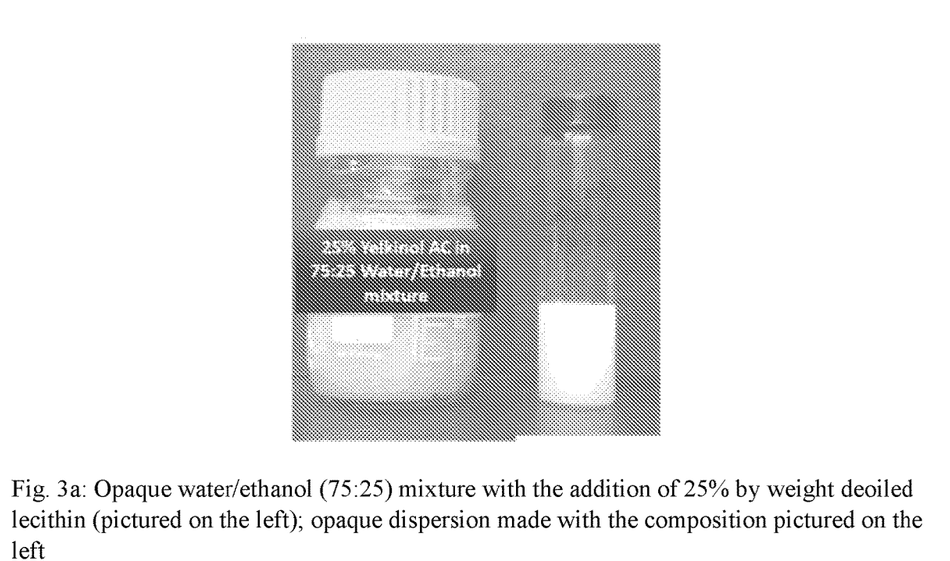
FIG. 3a shows a picture of additional embodiments of compositions of the present invention.
Figure 3B:
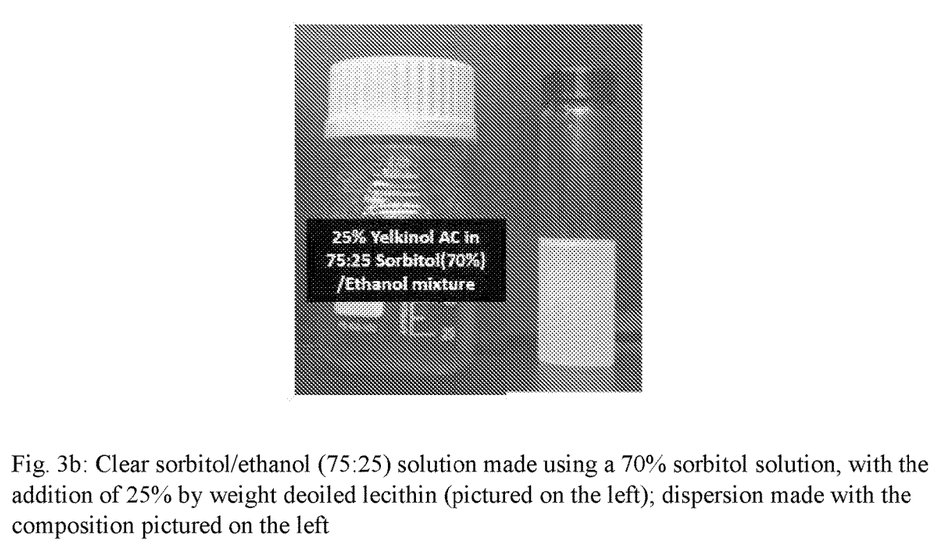
FIG. 3b shows a picture of additional embodiments of compositions of the present invention.

In this example, 25% by weight deoiled lecithin (Yelkinol AC, from ADM) was added to a 75:25 water/ethanol mixture (FIG. 3a), and the resulting mixture was compared to a solution wherein 25% by weight deoiled lecithin was added to a 75:25 sorbitol/ethanol solution (made using a 70% sorbitol solution). (FIG. 3b). On the left of FIG. 3a, an opaque water/ethanol (75:25) mixture with the addition of 25% by weight deoiled lecithin is shown. On the right of FIG. 3a, an opaque dispersion made with the water/ethanol (75:25) mixture with the addition of 25% by weight deoiled lecithin is shown. On the left of FIG. 3b, a clear sorbitol/ethanol (75:25) solution made using a 70% sorbitol solution, with the addition of 25% by weight deoiled lecithin is shown. On the right of FIG. 3b, a dispersion made with the sorbitol/ethanol (75:25) solution (made using a 70% sorbitol solution), with the addition of 25% by weight deoiled lecithin is shown. Addition of the sugar alcohol solution reversed the fractionation of lecithin to produce a clear, water soluble product. Further, comparisons of the dispersions shown in FIG. 3a and FIG. 3b show that the presence of sorbitol results in relatively clear dispersions.

Figure 4:
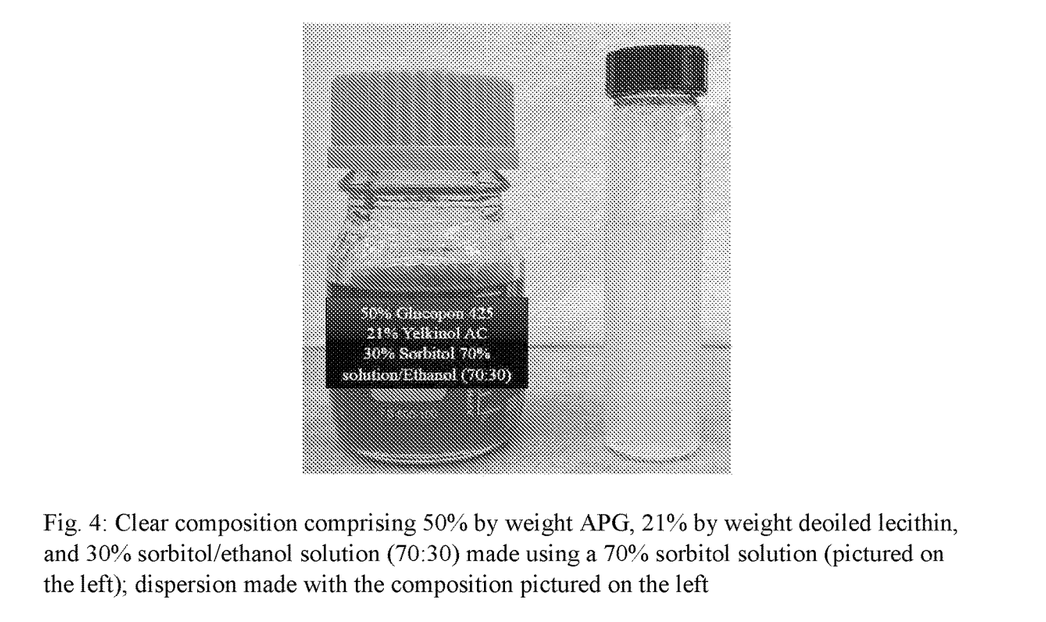
FIG. 4 shows a picture of additional embodiments of compositions of the present invention.

Example 7: Water Solubility of Lecithin in Mixtures with Addition of Alkyl Polyglycosides The effects of the addition of high HLB surfactants to deoiled lecithin in a sorbitol/ethanol solution were studied. Alkyl polyglycosides (APG) based on natural fatty alcohol C8-C14 (Glucopon® 425, from BASF) was used as a cosurfactant. A composition was made comprising 50% by weight APG (Glucopon® 425), 21% by weight deoiled lecithin (Yelkinol AC), 21% by weight sorbitol (70% sorbitol solution), and 9% by weight ethanol. The resulting composition was a completely clear, flowable liquid with high water solubility. (FIG. 4). On the left of FIG. 4, a clear composition is shown comprising 50% by weight APG, 21% by weight deoiled lecithin, and 30% sorbitol/ethanol solution (70:30) made using a 70% sorbitol solution. On the right of FIG. 4, a relatively clear dispersion made using the composition pictured on the left is shown. The addition of the sugar alcohol solution reversed the fractionation of the lecithin to produce a clear, water soluble product.

Figure 5A:
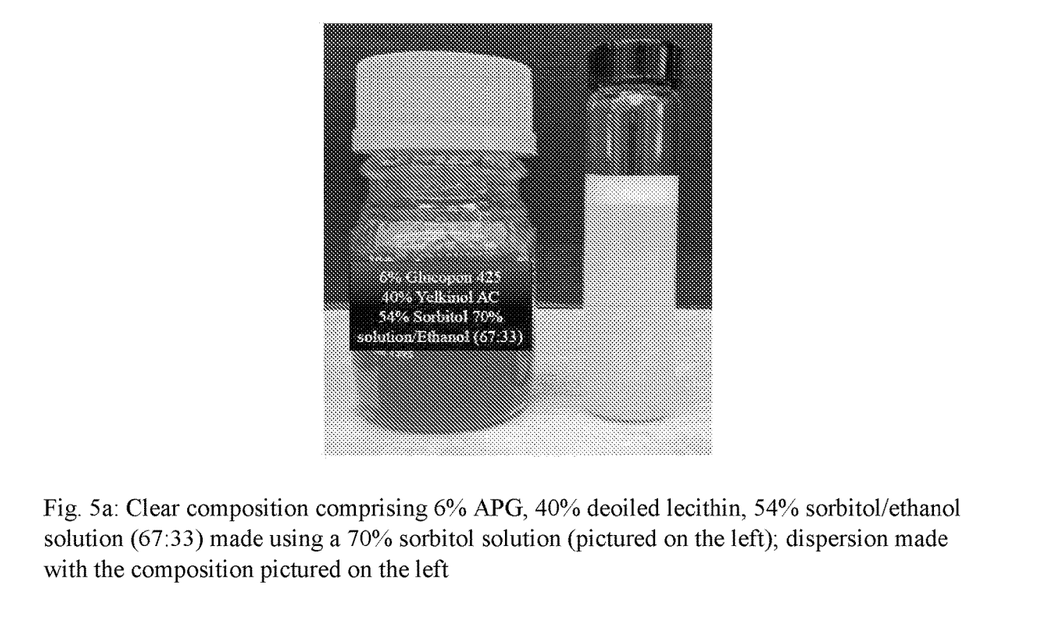
FIG. 5a shows a picture of additional embodiments of compositions of the present invention.
Figure 5B:
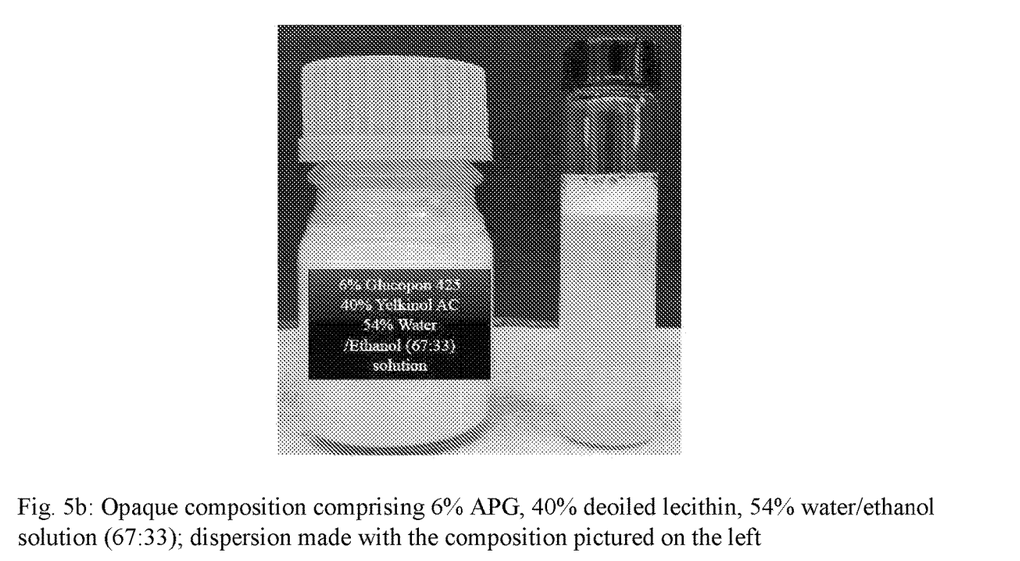
FIG. 5b shows a picture of additional embodiments of compositions of the present invention.

Example 8: Water Solubility of Lecithin in Mixtures with Smaller Addition of Alkyl Polyglycosides A composition was made comprising 40% by weight deoiled lecithin (Yelkinol AC, from ADM), 36% by weight sorbitol (70% sorbitol solution), 18% by weight ethanol, and 6% by weight APG (Glucopon® 425, from BASF). The product was completely clear. (FIG. 5a). On the left of FIG. 5a, the clear composition of this example is shown. On the right of FIG. 5a, a dispersion made using the composition of this example is shown. Incorporating a higher concentration of deoiled lecithin is a challenge, as a better dispersed product has better functionality. The composition of this example is fluid, which allows an ease of dispersion and maximizes its functionality.

Example 9: Solubility of Higher Concentration of Lecithin in Mixtures

When a higher concentration of lecithin is used in sorbitol/ethanol-containing compositions, the resulting compositions are very viscous and can be readily diluted in propylene glycol (PG), with product clarity maintained. The composition from Example 8 comprising 40% by weight deoiled lecithin (Yelkinol AC, from ADM), 36% by weight sorbitol (70% sorbitol solution), 18% by weight ethanol, and 6% by weight APG (Glucopon® 425, from BASF), was easily soluble in PG. Therefore, PG can be used as a diluent to make more concentrated lecithin products comprising as high as 50% deoiled lecithin, when a sugar alcohol and an alcohol are present in the composition. However, PG alone does not solubilize deoiled lecithin. Generally, the sorbitol/ethanol mixture has been found to improve the solubility of insoluble carbohydrates.

Example 10: Solubility of Lecithin in Mixtures with Addition of Alkyl Polyglycosides In this example, the addition of alkyl polyglycosides to the clear lecithin in sorbitol/ethanol solution (made using a 70% sorbitol solution) was tested. A blend including 50% alkyl polyglycosides (Glucopon® 425), 21% deoiled lecithin, 21% sorbitol (70% solution), and 9% ethanol was found to be easily water soluble. This blend was used as a surfactant base concentrate to make microemulsions with soy methyl ester, limonene, their blends, and mint oil. This blend could have an application in chewing gum. Specifically, the desire for a long-lasting mint flavor has been a challenge to the chewing gum industry. Deoiled lecithin is currently used in gum bases. Use of the water soluble lecithin of the present invention could be advantageous, as addition of the water soluble lecithin of the present invention to sorbitol present in the flavoring portion of the chewing gum will act synergistically with the emulsifier already present in the gum base.

Example 11: Solubility of Lecithin in Mixtures with Addition of Sucrose Esters

In addition to alkyl polyglycosides (APG), there are other high HLB surfactants, including food-grade sucrose esters, which can be added to a composition comprising deoiled lecithin and a sorbitol/ethanol solution. In this example, the surfactant used was a 50% active solution of sucrose esters of fatty acids (stearate/palmitate) (HLB=11) (Sisterna® SP 50, from Sisterna). A composition comprising 50% by weight sucrose esters (Sisterna® SP 50), 21% by weight deoiled lecithin (Yelkinol AC, from ADM), 21% by weight sorbitol (70% sorbitol solution), and 9% by weight ethanol was made. The resulting composition was a completely clear, low viscosity liquid with high water solubility. The addition of the sugar alcohol solution was found to reverse the fractionation of the lecithin to produce a clear, water soluble product. Therefore, sucrose esters can be used in a surfactant concentrate to make microemulsions, notably without polysorbates.

Example 12: Oil Recovery Using Water Soluble Lecithin Mixture

The blend from Example 7 (50% alkyl polyglycosides (Glucopon® 425, from BASF), 21% deoiled lecithin, 21% sorbitol (70% solution), and 9% ethanol) was tested in syrup from a corn dry mill process for oil recovery. Typically, polysorbates (i.e. Polysorbate 80) are used commercially for oil recovery, and therefore Polysorbate 80 was compared to the blend from Example 7. The blend from Example 7 was superior even to the neat alkyl polyglycosides (APG) (Glucopon® 425, from BASF). (FIG. 6).

Figure 6:
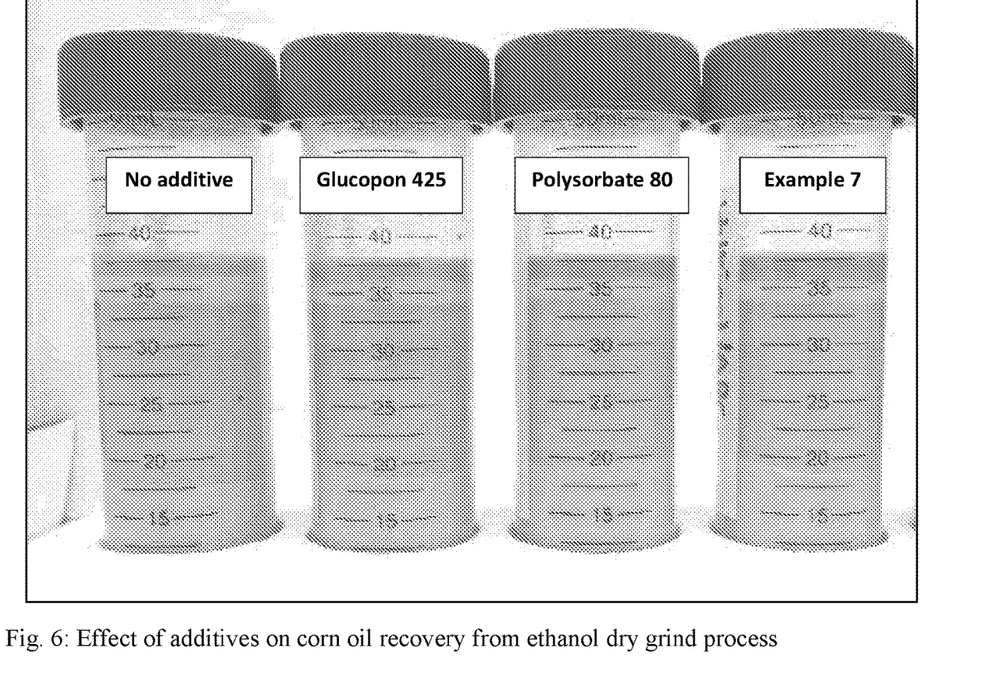
FIG. 6 shows a picture of embodiments of compositions resulting from methods of the present invention.

FIG. 6 shows four samples of thin stillage from an ethanol dry grind process, each with either no additive or a different type of corn oil recovery additive. The additive concentration was 200 ppm based on a total weight of 40 g of syrup for the three samples containing additive (either Glucopon® 425, Polysorbate 80, or the composition of Example 7). The samples were well mixed and placed in a water bath at 85° C. for 20 minutes. The samples were removed from the bath and centrifuged at 4500 rpm for 4 minutes. The oil recovery from the samples containing additive were compared to the control (no additive).

The vial on the far left of FIG. 6 has no additive and has a small oil layer on the top. The vial second from the left has the additive alkyl polyglycosides (Glucopon® 425, from BASF) and has a greater amount of corn oil separated as a top layer compared to the sample with no additive. The vial third from the left has the additive Polysorbate 80 (polyoxyethylene (20) sorbitan monooleate) and has a similar amount of corn oil separated as a top layer compared to the sample with Glucopon® 425. The vial on the far right has the additive from Example 7 (50% alkyl polyglycosides (Glucopon® 425), 21% deoiled lecithin, 21% sorbitol (70% solution), and 9% ethanol) and has a greater amount of corn oil separated as a top layer compared to either the sample with Glucopon® 425 or the sample with Polysorbate 80. Therefore, use of the blend from Example 7 provided the advantages of being 100% bio-based with no petroleum-based derivatives as well as greater yield of corn oil separated from the ethanol dry grind process.

Example 13: Oil Recovery Using Lecithin Mixture Comprising Ethoxylated Monoglycerides and PG In addition to Example 12, there are other high HLB surfactants that can be added to lecithin to produce a composition useful as an additive in the oil recovery process. A lecithin-cosurfactant blend was prepared by mixing: 80% by weight lecithin (from ADM), 10% by weight ethoxylated monoglycerides (from BASF), 2% by weight propylene glycol, and 8% by weight soybean oil. The blend was mixed at 50° C. under constant stirring for between 30 minutes and 60 minutes, thus producing an amber, transparent lecithin-cosurfactant blend, which can be used as an emulsifier.

Figure 7:
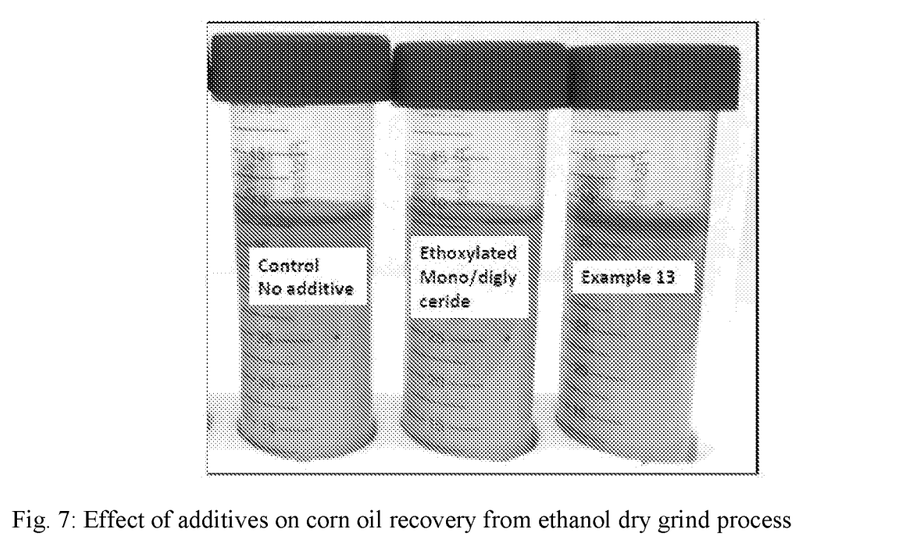
FIG. 7 shows a picture of embodiments of compositions resulting from methods of the present invention.

This emulsifier blend was used as an additive in corn oil recovery from an ethanol dry mill process. The emulsifier blend of Example 13 was compared to an additive of ethoxylated mono- and di-glycerides, which were both compared to a control (no additive). (FIG. 7). The additive concentration was 200 ppm based on a total weight of 40 g of syrup for the two samples containing additive (either ethoxylated mono- and di-glycerides or the composition of Example 13). The samples were well mixed and placed in a water bath at 85° C. for 20 minutes. The samples were removed from the bath and centrifuged at 4500 rpm for 4 minutes. The oil recovery from the samples containing additive were compared to the control (no additive).

The vial on the left of FIG. 7 has no additive and has a small oil layer on the top. The vial in the middle has the additive ethoxylated mono- and di-glycerides and also has a small amount of corn oil separated as a top layer. The vial on the right has the additive from Example 13 (80% by weight lecithin (from ADM), 10% by weight ethoxylated monoglycerides (from BASF), 2% by weight propylene glycol, and 8% by weight soybean oil) and has a greater amount of corn oil separated as a top layer compared to the control and the sample with the ethoxylated mono- and di-glycerides. Therefore, use of the blend from Example 13 provided the advantage of greater yield of corn oil separated from the ethanol dry grind process.

Example 14: Solubility of Lecithin in Mixtures with Addition of Other Emulsifiers Instead of using alkyl polyglycosides in combination with a sorbitol/ethanol (75:25) solution made using a 70% sorbitol solution, the addition of 25% by weight deoiled lecithin combined with quillaj a (quillaj a) was used. Quillaja is a natural, generally recognized as safe (GRAS), food-grade surfactant rich in saponins. Quillaja is commonly used as an emulsifier in stabilizing emulsions in food and personal care industries, especially when clear systems are desired. Quillaja can be safely consumed, for example when used in beverage emulsions. In this example, a blend comprising 27% deoiled lecithin, 28% sorbitol (70% solution), and 12% ethanol was pre-made, and 33% Ultra Liquid (Quillaja extract, Desert King, CA) was added to make a clear solution. This solution blend can be used in making microemulsions to solubilize active ingredients, for example 1% weight/volume (w/v) beta carotene (beta carotene in soybean oil). The finished microemulsions can be delivered in a clear, water soluble beverage system. An advantage of the compositions of this example is that the use of any polysorbate has been eliminated.

Figure 8:
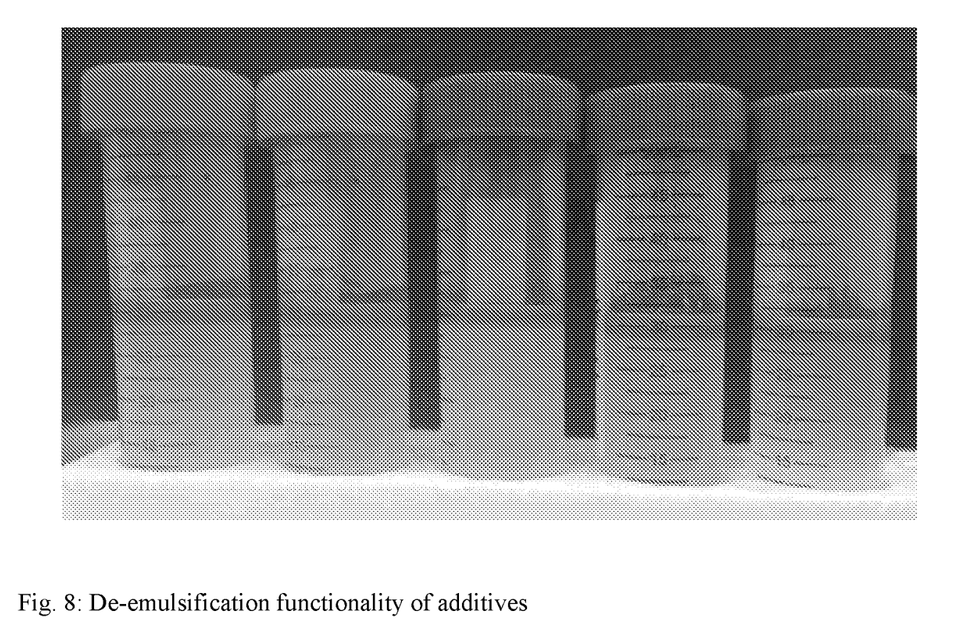
FIG. 8 shows a picture of embodiments of compositions resulting from methods of the present invention.

Example 15: De-Emulsification Functionality of Emulsifiers and Emulsifier Blends Samples were prepared of the emulsifiers and emulsifier blends to be screened for use in corn oil recovery processes. Two 100 mL solutions of each emulsifier or emulsifier blend were prepared—one solution at 200 ppm and the other solution at 400 ppm (the emulsifier or emulsifier blend, in water). These emulsifier solutions were heated to ensure solubility. 30 mL of the emulsifier solutions was combined with 0.5 g of oil (dye added), vortexed, and heated to 85° C. in a water bath to form emulsifier-oil blends. The emulsifier-oil blends were centrifuged at 3000 rpm for 3 minutes, and separation was observed. An oil layer formed on top of a water layer, and the amount of oil separated can be measured. The color of the water layer for each sample is a good indication of the de-emulsification ability of the emulsifiers used. Results for several of the emulsifiers and emulsifier blends are shown in FIG. 8. On the far left of FIG. 8, the emulsifier used was alkyl polyglycosides (Glucopon® 425, from BASF). Second from the left of FIG. 8, the emulsifier used was alkyl polyglycosides (Glucopon® 425, from BASF) with 2% silica. In the center of FIG. 8, the emulsifier used was commercial polysorbate chemistry (i.e. Polysorbate 80). Second from the right of FIG. 8, the emulsifier blend used was 49% alkyl polyglycosides (Glucopon® 425, from BASF), 49% poly(ethylene glycol) mono oleate (PEG mono oleate), and 2% hydrophilic silica. On the far right of FIG. 8, the emulsifier blend used was 44% alkyl polyglycosides (Glucopon® 425, from BASF), 44% PEG mono oleate, 10% canola oil, and 2 hydrophilic silica. All the samples shows in FIG. 8 showed volumetrically similar amounts of oil separated out of the emulsifier-oil blends (as prepared according to this example). Table 4, below, lists the emulsifiers and emulsifier blends prepared according to this example.

TABLE 4

Emulsifiers and Emulsifier Blends Tested for De-emulsification Functionality

| Sample No. | Emulsifier or Emulsifier Blend |
| --- | --- |
| 1 | Polysorbate Chemistry (Commercial additive) |
| 2 | Alkyl polyglycosides (Glucopon ® 425) |
| 3 | Glucopon ® 425 + 2% hydrophilic silica |
| 4 | 85% Glucopon ® 425 + 15% lecithin |
| 5 | 83% Glucopon ® 425 + 15% lecithin + 2% hydrophilic silica |
| 6 | 75% Glucopon ® 425 + 15% lecithin + 8% Canola Oil + 2% hydrophilic silica |
| 7 | Glucopon ® 425 + 10% Soy methyl ester + 2% hydrophilic silica |
| 8 | Glucopon ® 425 + 10% Canola Oil + 2% hydrophilic silica |
| 9 | 49% Glucopon ® 425 + 49% PEG Mono oleate + 2% hydrophilic silica |
| 10 | 44% Glucopon ® 425 + 44% PEG Mono oleate 10% Canola Oil + 2% hydrophilic silica |
| 11 | 44% Glucopon ® 425 + 44% PEG Mono dioleate 10% Canola Oil + 2% hydrophilic silica |
| 12 | 44% Glucopon ® 425 + 44% PEG Mono tallate 10% Canola Oil + 2% hydrophilic silica |
| 13 | 83% Glucopon ® 425 + 15% ethylene oxide/propylene oxide block copolymer (PLURONIC ® brand L 61, from BASF) + 2% hydrophilic silica |

Example 16: Oil Recovery Using Lecithin Mixture Comprising Ethoxylated Monoglycerides and Propylene Glycol In addition to Example 12, there are other high HLB surfactants that can be added to lecithin to produce a composition useful as an additive in an oil recovery process. A lecithin cosurfactant blend was prepared by mixing 56% by weight lecithin (ADM), 30% by weight ethoxylated monoglycerides (BASF), 11% by weight propylene glycol, and 3% by weight soybean oil, which mixing took place at 50° C. under constant stirring for between 30 minutes and 60 minutes, thus producing an amber, transparent lecithin cosurfactant blend. The blend may be used as an emulsifier.

Figure 9:
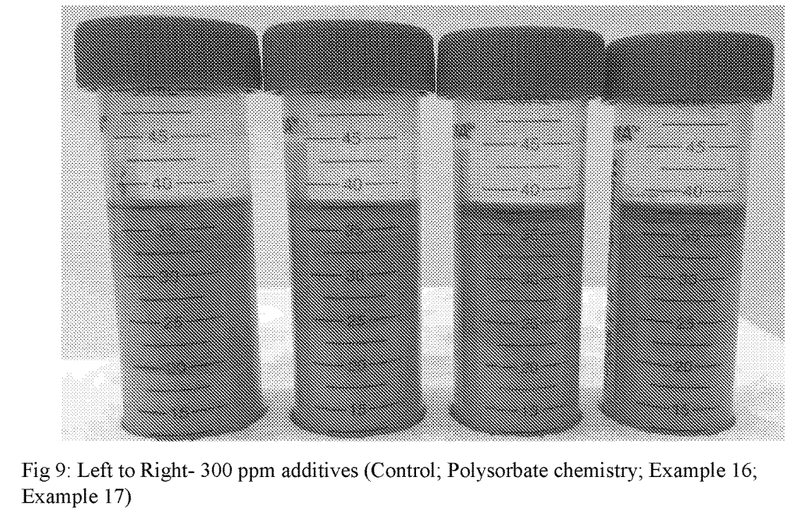
FIG. 9 shows a picture of embodiments of compositions resulting from methods of the present invention.

Example 17. Oil Recovery Using Lecithin Mixture Comprising Ethoxylated Monoglycerides and Silica The blend from Example 16 was blended with 3% hydrophilic silica. This new blend was compared with the blend from Example 16 as a corn oil recovery additive. The additive concentration was 300 ppm based on a total weight of 40 g of CDS syrup (condensed distillers soluble syrup from an ethanol plant) for the three samples containing additive (Polysorbate 80, the blend of Example 16, the blend of Example 17). The samples were well mixed and placed in a water bath at 85° C. for 20 minutes. The samples were removed from the bath and centrifuged at 4500 rpm for 4 minutes. The oil recovery from the samples containing additive were compared to the control (no additive).

The vial on the far left of FIG. 9 labeled control has no additive and has a small oil layer on the top. The vial second from the left of FIG. 9 labeled polysorbate chemistry has the additive Polysorbate 80 (polyoxyethylene (20) sorbitan monooleate) and has a small oil layer on the top. The vial third from the left of FIG. 9 labeled Example 16 has the additive from Example 16 (56% by weight lecithin (ADM), 30% by weight ethoxylated monoglycerides (BASF), 11% by weight propylene glycol, and 3% by weight soybean oil)

and has a greater amount of corn oil separated as a top layer compared to either the vial labeled control or the vial labeled polysorbate chemistry. The vial on the far right of FIG. 9 labeled Example 17 contains the additive from Example 17 (the blend of Example 16, blended with 3% hydrophilic silica) and has a greater amount of corn oil separated as a top layer compared to any of the vial labeled control, the vial labeled polysorbate chemistry, and the vial labeled Example 16.

Example 18: Oil Recovery Using Lecithin Mixture Comprising PEG 400 Monooleate and Propylene Glycol In addition to Examples 12 and 16, there are other high HLB surfactants that can be added to lecithin to produce a composition useful as an additive in the oil recovery process. A lecithin cosurfactant blend was prepared by mixing 56% by weight lecithin (ADM), 30% by weight PEG 400 monooleate (BASF), 11% by weight propylene glycol, and 3% by weight soybean oil, which mixing took place at 50° C. under constant stirring for between 30 minutes and 60 minutes, thus producing an amber, transparent lecithin cosurfactant blend. The blend may be used as an emulsifier.

Example 19: Oil Recovery Using Lecithin Mixture Comprising PEG 400 Monooleate, Propylene Glycol, and Silica The blend from Example 18 was blended with 3% hydrophilic silica. This new blend was compared with the blend from Example 18 as a corn oil recovery additive. The additive concentration was 300 ppm based on a total weight of 40 g of CDS syrup (condensed distillers soluble syrup from an ethanol plant) for the three samples containing additive (Polysorbate 80, the blend of Example 16, the blend of Example 17). The samples were well mixed and placed in a water bath at 85° C. for 20 minutes. The samples were removed from the bath and centrifuged at 4500 rpm for 4 minutes. The oil recovery from the samples containing additive were compared to the control (no additive).

Figure 10:
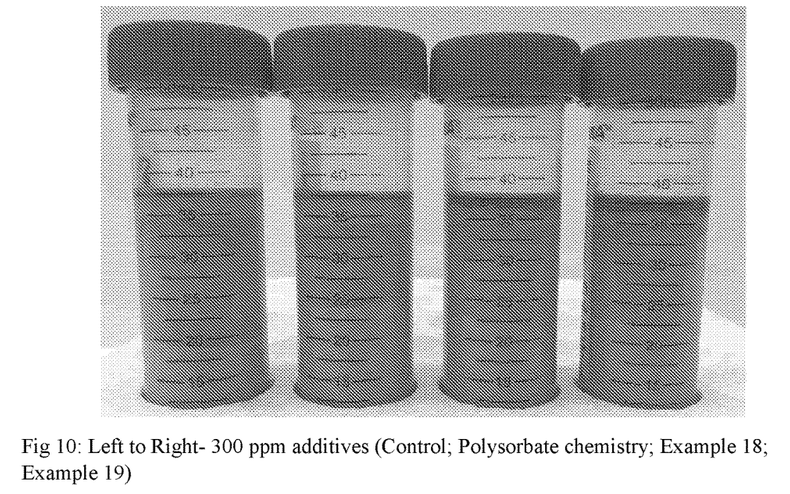
FIG. 10 shows a picture of embodiments of compositions resulting from methods of the present invention.

The vial on the far left of FIG. 10 labeled control has no additive and has a small oil layer on the top. The vial second from the left of FIG. 10 labeled polysorbate chemistry has the additive Polysorbate 80 (polyoxyethylene (20) sorbitan monooleate) and has a small oil layer on the top. The vial third from the left of FIG. 10 labeled Example 18 has the additive from Example 18 (56% by weight lecithin (ADM), 30% by weight PEG 400 monooleate (BASF), 11% by weight propylene glycol, and 3% by weight soybean oil) and has a greater amount of corn oil separated as a top layer compared to either the vial labeled control or the vial labeled polysorbate chemistry. The vial on the far right of FIG. 10 labeled Example 19 contains the additive from Example 19 (the blend of Example 18, blended with 3% hydrophilic silica) and has a greater amount of corn oil separated as a top layer compared to any of the vial labeled control, the vial labeled polysorbate chemistry, and the vial labeled Example 18.

The present invention has been described with reference to certain examples. However, it will be recognized by those of ordinary skill in the art that various substitutions, modifications, or combinations of any of the examples may be made without departing from the spirit and scope of the invention. Thus, the invention is not limited by the description of the examples, but rather by the appended claims as originally filed.

The invention claimed is:

1. A microemulsion comprising:
   a lecithin;
   a sugar alcohol;
   a cosurfactant selected from the group consisting of polysorbates, sorbitan esters, polyglyceril esters, sucrose esters, alkyl polyglucosides, alkyl polyglycosides, poloxamers, an ethylene oxide/propylene oxide block copolymer, ethoxylated fatty acids, ethoxylated monoglycerides, sodium dodecyl sulfate (SDS), sodium lauryl sulfate (SLS), quillaja, rhamnolipids, sophorolipids, and combinations of any thereof;
   a water soluble alcohol;
   a plant oil; and
   water.

2. The microemulsion of claim 1, wherein the lecithin is selected from the group consisting of crude lecithin, fluid lecithin, deoiled lecithin, fractionated lecithin, high phosphatidyl choline (PC) fraction lecithin, acetylated lecithin, hydrolyzed lecithin, hydroxylated lecithin, lecithin comprising enzyme modified phospholipids, and combinations of any thereof.

3. The microemulsion of claim 1, wherein the sugar alcohol comprises 3-12 carbon atoms.

4. The microemulsion of claim 3, wherein the sugar alcohol comprises a solution having from about 55% of the sugar alcohol to about 85% of the sugar alcohol.

5. The microemulsion of claim 1, wherein the sugar alcohol is present in an amount of at least 5% by weight of the microemulsion.

6. The microemulsion of claim 1, wherein the water soluble alcohol is selected from the group consisting of methanol, ethanol, propanol, butanol, and combinations of any thereof.

7. The microemulsion of claim 1, wherein the water soluble alcohol is present in an amount of less than 10% by weight of the microemulsion.

8. The microemulsion of 1, further comprising a sugar.

9. The microemulsion of claim 8, wherein the sugar is selected from the group consisting of corn syrup, high fructose corn syrup, glucose, fructose, sucrose, and combinations of any thereof.

10. The microemulsion of claim 6, wherein the water soluble alcohol is the ethanol.

11. A water soluble surfactant blend in the form of a microemulsion comprising:
    a cosurfactant selected from the group consisting of polysorbates, sorbitan esters, polyglyceril esters, sucrose esters, alkyl polyglucosides, alkyl polyglycosides, poloxamers, an ethylene oxide/propylene oxide block copolymer, ethoxylated fatty acids, ethoxylated monoglycerides, sodium dodecyl sulfate (SDS), sodium lauryl sulfate (SLS), quillaja, rhamnolipids, sophorolipids, and combinations of any thereof;
    about 5-60% of a lecithin;
    about 5-60% of a sugar alcohol;
    less than 15% of a water soluble alcohol;
    a plant oil; and
    water.

12. The water-soluble surfactant blend of claim 11, wherein the lecithin is the deoiled lecithin or the fluid lecithin.

13. The water-soluble surfactant blend of claim 11, wherein the sugar alcohol is selected from the group consisting of sorbitol, erythritol, xylitol, mannitol, lactitol, malitol, isomalt, and combinations of any thereof.

14. The water-soluble surfactant blend of claim 11, wherein a ratio of the sugar alcohol to the alcohol is from about 60:40 to about 90:10.

15. The water-soluble surfactant blend of claim 11, wherein the water soluble alcohol is ethanol.

* * * * *